(12) United States Patent
Hatanaka

(10) Patent No.: US 10,303,143 B2
(45) Date of Patent: May 28, 2019

(54) NUMERICAL CONTROLLER

(71) Applicant: FANUC CORPORATION, Minamitsuru-gun, Yamanashi (JP)

(72) Inventor: Noriaki Hatanaka, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 238 days.

(21) Appl. No.: 15/358,594

(22) Filed: Nov. 22, 2016

(65) Prior Publication Data

US 2017/0146967 A1 May 25, 2017

(30) Foreign Application Priority Data

Nov. 25, 2015 (JP) .................................. 2015-230034

(51) Int. Cl.
*G05B 19/042* (2006.01)
*G05B 19/414* (2006.01)

(52) U.S. Cl.
CPC ..... *G05B 19/0421* (2013.01); *G05B 19/4148* (2013.01); *G05B 2219/2214* (2013.01); *G05B 2219/34019* (2013.01)

(58) Field of Classification Search
CPC combination set(s) only.
See application file for complete search history.

(56) References Cited

U.S. PATENT DOCUMENTS

2002/0049512 A1 4/2002 Mizuno et al.
2014/0042950 A1 2/2014 Aoyama et al.
2014/0316565 A1 10/2014 Aoyama

FOREIGN PATENT DOCUMENTS

| JP | H04155405 A | 5/1992 |
| JP | H06222816 A | 8/1994 |
| JP | H09305212 A | 11/1997 |
| JP | 2014-35564 | 2/2014 |
| JP | 2014-211721 | 11/2014 |

OTHER PUBLICATIONS

Notification of Reasons for Refusal for Japanese Application No. 2015-230034, dated Nov. 28, 2017, including English translation, 4 pages.

*Primary Examiner* — Ratisha Mehta
(74) *Attorney, Agent, or Firm* — RatnerPrestia

(57) ABSTRACT

A numerical controller of the invention includes a multi-core processor having a plurality of central processing unit (CPU) cores. Herein, importance is assigned in advance to each of a plurality of processes related to numerical control, and load distribution of the multi-core processor is performed by allocating the respective processes to the plurality of CPU cores based on the assigned importance.

4 Claims, 4 Drawing Sheets

BEFORE NUMERICAL CONTROL PROCESS
APPLICATION STARTS

BEFORE NUMERICAL CONTROL PROCESS
APPLICATION STARTS

FIG. 3

SIGNIFICANT PROCESS
MANAGEMENT TABLE

200

|   | SIGNIFICANT PROCESS |
|---|---|
| 1 | PROGRAM INSTRUCTION ANALYSIS PROCESS |
| 2 | INTERPOLATION PROCESS |

FIG. 4

SIGNIFICANT PROCESS
MANAGEMENT TABLE

200

|   | SIGNIFICANT PROCESS | IMPORTANCE |
|---|---|---|
| 1 | PROGRAM INSTRUCTION ANALYSIS PROCESS | HIGH |
| 2 | INTERPOLATION PROCESS | HIGH |
| 3 | AUXILIARY FUNCTION PROCESS | LOW |
| 4 | PERIPHERAL EQUIPMENT CONTROL PROCESS | LOW |

NUMERICAL CONTROLLER

BACKGROUND OF THE INVENTION

1. Field of the Invention

The present invention relates to a numerical controller, and particularly relates to a numerical controller that performs optimal load distribution using a plurality of central processing unit (CPU) cores.

2. Description of the Related Art

As a conventional art related to a numerical controller including a plurality of CPU cores, for example, JP 2014-211721 A and JP 2014-035564 A disclose a scheme of executing a process, which is related to numerical control performed when a machine is controlled, by a different CPU core from a CPU core that performs a PMC process or a robot control process.

An influence of an increase in load due to the PMC process or the robot control process on execution of a numerical control process can be excluded using technologies disclosed in JP 2014-211721 A and JP 2014-035564 A.

Examples of the numerical control process performed by the numerical controller mainly include an interpolation process that performs a movement axis instruction every certain time, a program instruction analysis process (preprocessing) that analyzes a program instruction, and other numerical control processes such as an auxiliary function process and a peripheral equipment control process. Among these processes, the program instruction analysis process or the interpolation process is considered a significant process that greatly affects performance of the numerical controller. However, in the technologies disclosed in JP 2014-211721 A and JP 2014-035564 A, the numerical control process is configured to be performed by one CPU core. Thus, for example, loads of the program instruction analysis process and the interpolation process are concentrated on the same CPU core when a processing program instruction of a minute segment used in die machining, etc. is processed. Therefore, there has been a problem that performance of the numerical controller cannot be sufficiently exhibited.

SUMMARY OF THE INVENTION

In this regard, an object of the invention is to provide a numerical controller capable of improving performance by distributing loads on a plurality of CPU cores with regard to a significant process related to numerical control.

In the invention, performance is improved by distributing loads in a numerical controller in which a multi-core CPU is mounted. In particular, a program analysis process (preprocessing) and an interpolation process, which are significant and have heavy processing loads, are performed in different CPU cores from a CPU core of a process related to another numerical control. CPU cores, to which the program analysis process (preprocessing) and the interpolation process are suitably allocated, are selected.

In addition, a numerical controller according to the invention is a numerical controller for performing numerical control on a machine based on a program, including a multi-core processor having a plurality of CPU cores, wherein importance is assigned in advance to each of a plurality of processes related to the numerical control, and load distribution of the multi-core processor is performed by allocating the respective processes to the plurality of CPU cores based on the assigned importance.

The numerical controller is characterized in that a process having high importance among the plurality of processes is allocated to a specific one of the CPU cores.

The numerical controller is characterized in that a program instruction analysis process among the plurality of processes is allocated to a specific one of the CPU cores.

The numerical controller is characterized in that an interpolation process among the plurality of processes is allocated to a specific one of the CPU cores.

The numerical controller is characterized in that at least the program instruction analysis process and the interpolation process among the plurality of processes are allocated to different ones of the CPU cores.

The numerical controller is characterized in that program instruction analysis processes among the plurality of processes are distributed and allocated to a plurality of specific ones of the CPU cores.

The numerical controller is characterized in that loads of the CPU cores are measured when the processes start, and the process having high importance is allocated to a CPU core having a light load.

The numerical controller is characterized in that allocation of the processes to the CPU cores is optimized by repeating a test operation at a time of load allocation.

According to the invention, maximum resources can be allocated to a significant process (preprocessing), and performance of a numerical controller can be exhibited. In addition, maximum resources can be allocated to a significant process (preprocessing, an interpolation process, etc.), and performance of a numerical controller can be exhibited.

BRIEF DESCRIPTION OF THE DRAWINGS

The above-described object and characteristic of the invention and other objects and characteristics will be clear from description of examples below with reference to accompanying drawings. In the drawings:

FIG. 3 is a diagram illustrating an example (1) of a significant process management table used to identify a significant process among numerical control processes;

FIG. 4 is a diagram illustrating an example (2) of the significant process management table used to identify a significant process among numerical control processes.

DETAILED DESCRIPTION OF THE PREFERRED EMBODIMENTS

Hereinafter, an embodiment of the invention will be described together with drawings.

Figure 1:
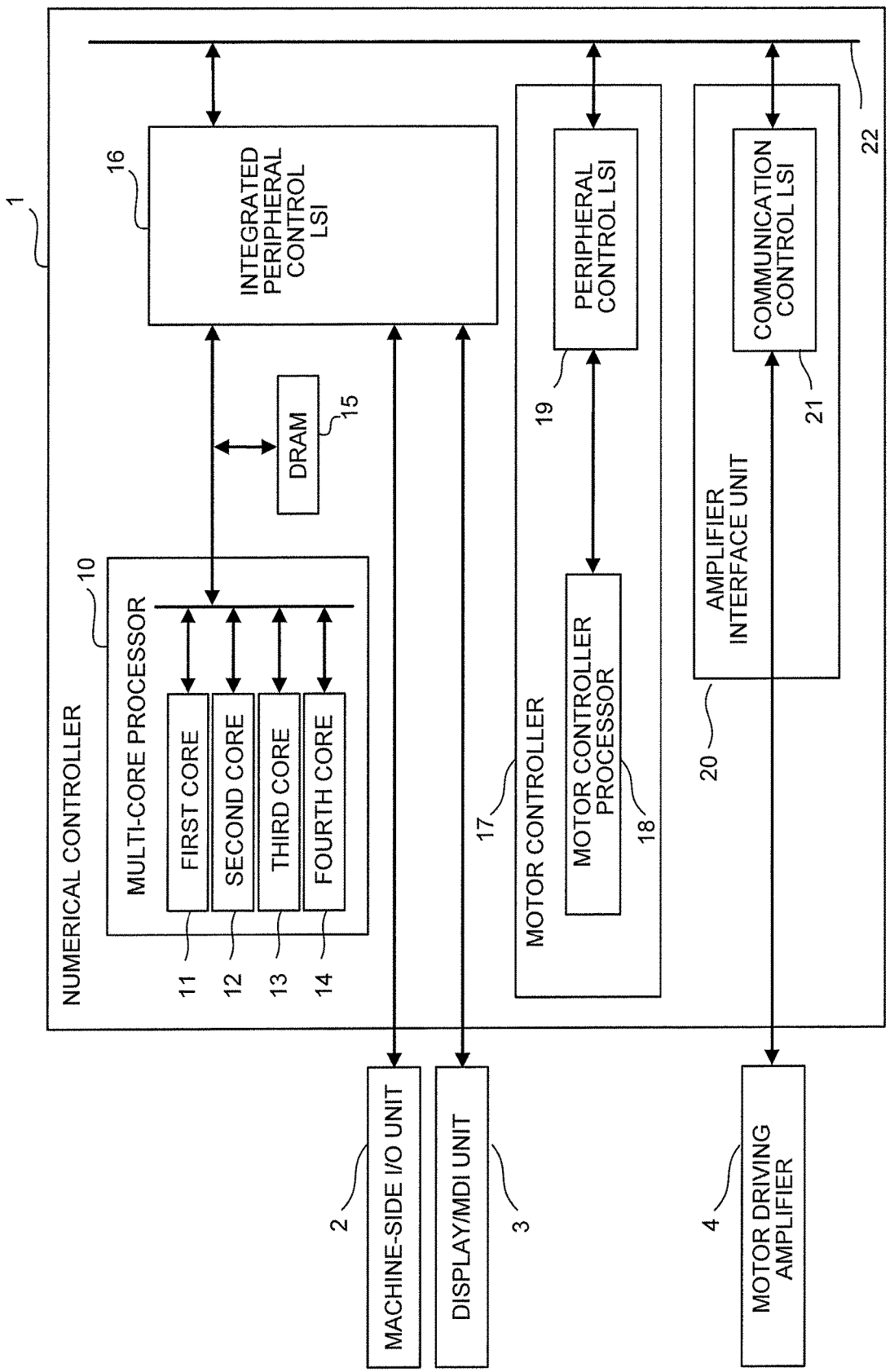
FIG. 1 is a block diagram illustrating a main part of a numerical controller according to an embodiment of the invention.

FIG. 1 is a block diagram illustrating a main part of a numerical controller having a multi-core processor according to an embodiment of the invention. In a numerical controller 1, a multi-core processor 10 including a plurality of CPU cores and an integrated peripheral control large scale integrated circuit (LSI) 16 are mounted. Further, the numerical controller 1 includes a motor controller 17 which has a motor controller processor 18 and a peripheral control LSI 19 thereof, and an amplifier interface unit 20 which performs communication with a motor driving amplifier 4. The respective units are connected by an internal bus 22. As an example, the multi-core processor 10 has four cores 11 to 14. In addition, the multi-core processor 10 has a shared memory used in inter-core communication for sharing information among the respective cores 11 to 14. For example, a dynamic random access memory (DRAM) 15 is used as the shared memory.

In the multi-core processor 10, a processing program for controlling the motor driving amplifier 4 connected to the numerical controller 1 is analyzed by performing a processing program analysis process, a movement instruction is prepared by performing a movement instruction preparation process based on an analysis result, and the movement instruction is transmitted to a RAM (not illustrated) inside the peripheral control LSI 19 of the motor controller 17 through the integrated peripheral control LSI 16 and the internal bus 22.

In the motor controller processor 18 of the motor controller 17, a movement instruction written to a RAM inside the motor controller processor 18 is read, motor control data to be transmitted to the motor driving amplifier 4 is prepared, and the data is written to a communication control LSI 21 of the amplifier interface unit 20 through the internal bus 22.

In the communication control LSI 21 of the amplifier interface unit 20, the data written to a RAM inside the communication control LSI 21 is transmitted to the motor driving amplifier 4, and the motor driving amplifier 4 drives a motor (not illustrated) included in a machine tool.

In addition, in the multi-core processor 10, a PMC process of executing a program for controlling a predetermined sequence is performed based on input data from a machine (not illustrated) connected to the numerical controller 1, etc. Further, a signal for controlling each machine component of the machine based on a PMC process result is transmitted to a machine-side I/O unit 2.

A display/MDI unit 3 is a manual data input device including a display, a keyboard, etc. The integrated peripheral control LSI 16 receives an instruction and data from the keyboard, delivers the received instruction and data to the multi-core processor 10, and outputs a display instruction, which is output from a display process performed in the multi-core processor 10, to the display.

Figure 2A:
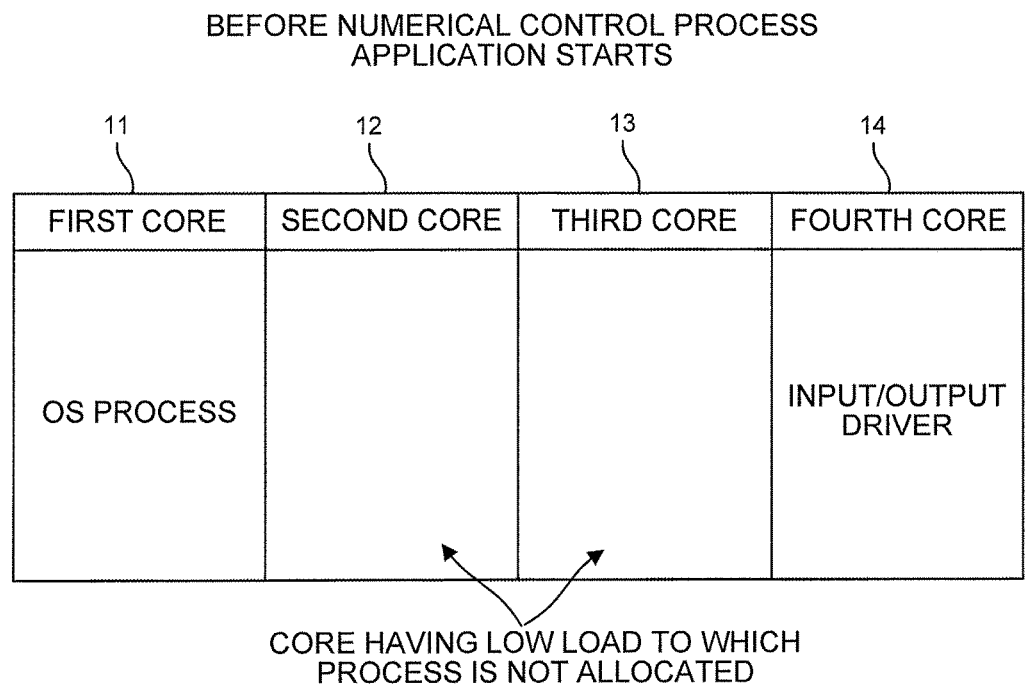
FIG. 2A is a diagram illustrating allocation of a process to each core of a multi-core processor of FIG. 1 before a numerical control process application starts.
Figure 2B:
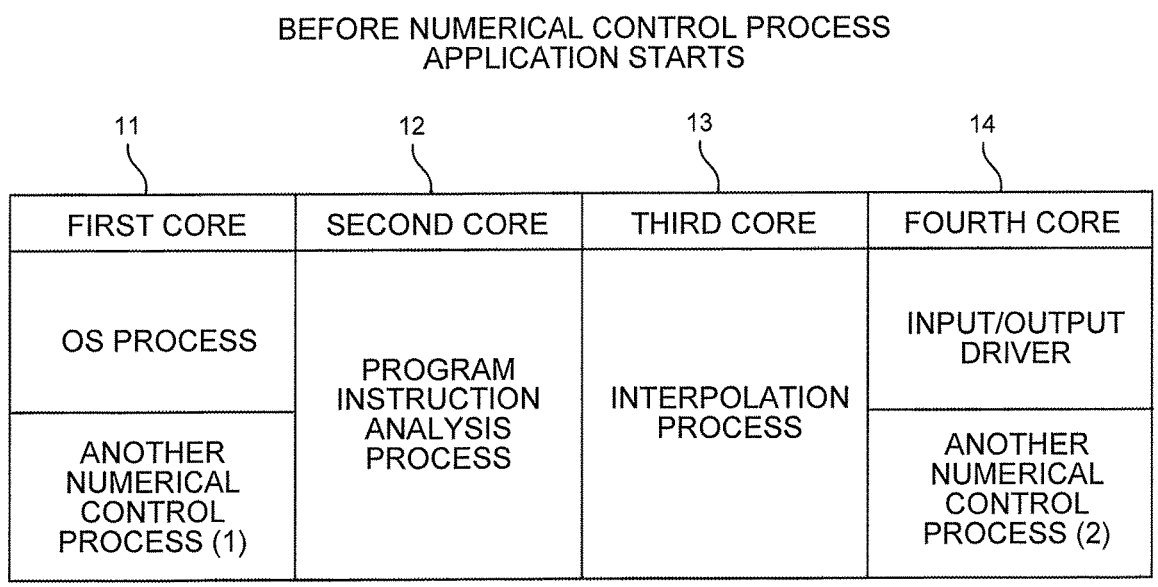
FIG. 2B is a diagram illustrating allocation of a process to each core of the multi-core processor of FIG. 1 before the numerical control process application starts.

FIG. 2A and FIG. 2B are diagrams illustrating an allocation of processes to CPU cores in the numerical controller 1 according to the present embodiment. In a previous step in which a numerical control process for controlling the machine starts while the numerical controller 1 operates, an operating system (OS) process in charge of a basic operation of controlling the whole numerical controller 1 or an input/output driver process of controlling each piece of hardware connected to the numerical controller 1 is allocated to any one of the respective cores 11 to 14 and performed (in an example of FIG. 2A, the OS process is allocated to the first core 11, and the input/output driver process is allocated to the second core 14, respectively). However, a large proportion of the OS process or the input/output driver process is designed such that a core change is minimized after being performed in a specific core.

Meanwhile, examples of a process performed at the time of controlling the machine in the numerical controller 1 mainly include an interpolation process that performs a movement axis instruction every certain time, a program instruction analysis process (preprocessing) that analyzes a program instruction, and other numerical control processes such as an auxiliary function process and a peripheral equipment control process. Among these processes, the program instruction analysis process is a significant process that greatly affects performance of the numerical controller 1. In addition, the interpolation process is a process that calculates a position every micro time on a movement path, and thus is a process that places a high load on a core. Therefore, this interpolation process may be considered a significant process. In this regard, in the invention, maximum calculation resources are allocated to the significant processes (the program instruction analysis process and the interpolation process) by allocating these two processes to different cores, thereby allowing performance of the numerical controller to be exhibited.

In the numerical controller 1 according to the present embodiment, cores among the cores 11 to 14 to which the OS process, the input/output driver process, etc. are allocated are investigated using a function included in an OS as a standard when an application that executes the numerical control process is started. Further, the significant processes in numerical control (the program instruction analysis process and the interpolation process) are allocated to cores (cores having low loads) to which the OS process or the input/output driver process is not allocated. In addition, when a significant process is allocated to a core, load balancing is attempted by not allocating a new significant process to a core to which another significant process is previously allocated (in FIG. 2B, the program instruction analysis process is allocated to the second core 12, and the interpolation process is allocated to the third core 13).

A core to which a significant process is allocated may be selected according to an allocation state of a current process as described above, and may be selected according to a load state of each core. In addition, a core to which the OS process, the input/output driver process, etc. is allocated may be investigated in advance, and a fixed significant process may be allocated to another specific core.

After a significant process is allocated to a core, a load condition of each core may be monitored while automatically repeating a test operation before a main operation starts, and allocation of a process, which is allocated to a core having an increased load, may be changed to another core, thereby optimizing allocation of each numerical control process.

Referring to whether each numerical control process is a significant process, for example, importance may be assigned to a program of each numerical control process in advance, and whether the program of each numerical control process is a significant process may be determined based on the importance. In an example of a method thereof that can be considered, as illustrated in FIG. 3, a significant process management table 200, in which an identification name (a program name, a processing name, etc.) of a significant numerical control process is registered, is provided in a memory of the numerical controller 1, the numerical control process is determined to be a process having high importance when the numerical control process is registered in the significant process management table 200 by referring to the significant process management table 200 at the time of starting the numerical control process, and the numerical control process is allocated to a core having a light load to which another process is not allocated. In addition, as illustrated in FIG. 4, a significant process management table 200, in which an identification name (a program name, a processing name, etc.) of a significant numerical control process is associated with importance, may be provided in the memory of the numerical controller 1, and importance of the numerical control process may be determined with reference to the significant process management table 200 when the numerical control process is started.

Figure 5:
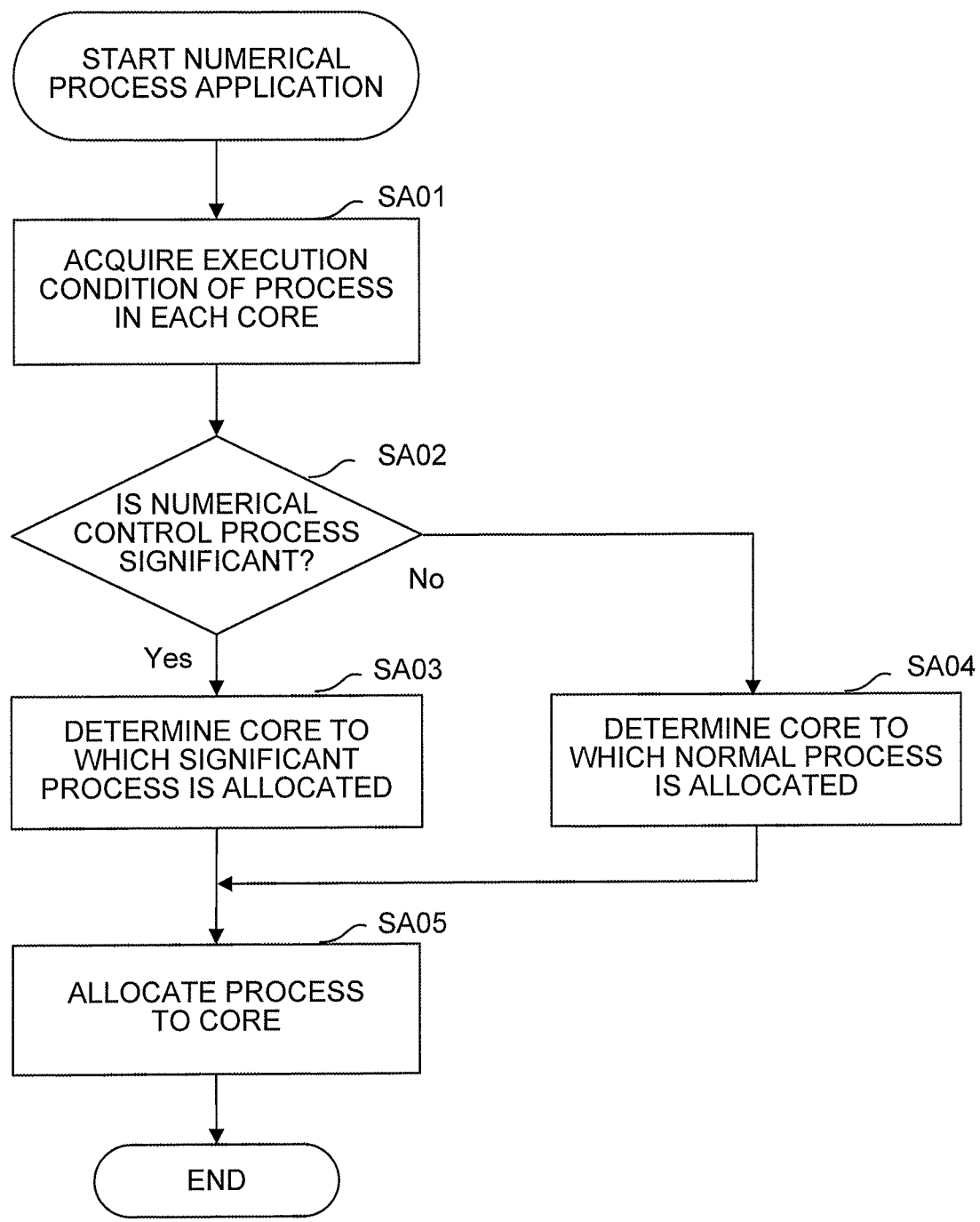
FIG. 5 is a flowchart of a process of allocating a numerical control process performed in the numerical controller of FIG. 1 to a core.

FIG. 5 is a flowchart illustrating a process performed when an application of the numerical control process starts in the numerical controller 1 of the present embodiment.

[Step SA01] When the application of the numerical control process is executed, information related to an execution condition of each process executed in the respective cores 11 to 14 of the multi-core processor 10 is acquired using a standard function of the OS. The acquired information includes a name of a process performed in each core, a load condition of each core, etc.

[Step SA02] Whether the numerical control process performed by the started application is a significant process is determined. The process proceeds to step SA03 when the numerical control process is a significant process, and the process proceeds to step SA04 when the numerical control process is a normal process.

[Step SA03] Among the respective CPU cores 11 to 14, a core, to which a significant numerical control process corresponding to one of the OS process, the input/output driver process, and other numerical control processes is not allocated, is determined to be a core to which the numerical control process started this time is allocated.

[Step SA04] Among the respective CPU cores 11 to 14, a core, to which a significant numerical control process corresponding to one of other numerical control processes is not allocated, is determined to be a core to which the numerical control process started this time is allocated.

[Step SA05] The numerical control process performed by the started application is allocated to the core determined in step SA03 or SA04.

Hereinbefore, the embodiment of the invention has been described. However, the invention is not restricted to an example of the above-described embodiment, and may be implemented in various modes by appropriately making alterations.

For example, the above-described embodiment illustrates an example in which the program instruction analysis process is allocated as one process to one core. However, when processes that can operate in parallel are present in the program instruction analysis process (for example, when an internal process is previously programmed for parallel processing such as a thread, or when an object that can be executed in parallel with a program instruction corresponding to an analysis countermeasure is included), respective program instruction analysis processes that can be operated in parallel may be distributed and allocated to a plurality of cores. In this case, a core, to which the OS process, the input/output driver process, etc. is not allocated, is selected as a core to which each of the program instruction analysis processes that can be operated in parallel is allocated. Further, the process is not allocated to the same core as that of the interpolation process. In this way, performance of the numerical controller may be further exhibited.

The invention claimed is:

1. A numerical controller for performing numerical control on a machine based on a program, the numerical controller comprising:
a motor controller configured to control a motor of the machine; and
a multi-core processor having a plurality of central processing unit (CPU) cores, the multi-core processor configured to:
assign importance in advance to each of a plurality of processes related to the numerical control,
perform load distribution by allocating the respective processes to the plurality of CPU cores based on the assigned importance,
allocate at least the program instruction analysis process and an interpolation process among the plurality of processes to different ones of the CPU cores,
perform the program instruction analysis process and the interpolation process using the different CPU cores, and
control the motor controller to control the motor of the machine based on the performed program instruction analysis process and the interpolation process.

2. A numerical controller for performing numerical control on a machine based on a program, the numerical controller comprising:
a motor controller configured to control a motor of the machine; and
a multi-core processor having a plurality of central processing unit (CPU) cores, the multi-core processor configured to:
assign importance in advance to each of a plurality of processes related to the numerical control,
perform load distribution by allocating the respective processes to the plurality of CPU cores based on the assigned importance,
allocate and distribute program instruction analysis processes among the plurality of processes to a plurality of different ones of the CPU cores,
perform the program instruction analysis processes using the different CPU cores, and
control the motor controller to control the motor of the machine based on the performed program instruction analysis processes.

3. A numerical controller for performing numerical control on a machine based on a program, the numerical controller comprising:
a motor controller configured to control a motor of the machine; and
a multi-core processor having a plurality of central processing unit (CPU) cores, the multi-core processor configured to:
assign importance in advance to each of a plurality of processes related to the numerical control,
perform load distribution by allocating the respective processes to the plurality of CPU cores based on the assigned importance,
measure loads of the CPU cores when the processes start, allocate the process having high importance to a CPU core having a light load,
perform the program instruction analysis processes using different CPU cores, and control the motor controller to control the motor of the machine based on the performed program instruction analysis processes.

4. A numerical controller for performing numerical control on a machine based on a program, the numerical controller comprising:
a motor controller configured to control a motor of the machine; and
a multi-core processor having a plurality of central processing unit (CPU) cores, the multi-core processor configured to:

assign importance in advance to each of a plurality of processes related to the numerical control,
perform load distribution by allocating the respective processes to the plurality of CPU cores based on the assigned importance,
optimizing allocation of the processes to the CPU cores by repeating a test operation at the time of load allocation,
perform the program instruction analysis processes using different CPU cores, and
control the motor controller to control the motor of the machine based on the performed program instruction analysis processes.

\* \* \* \* \*